United States Patent [19]

Brown, Jr. et al.

[11] 4,239,355
[45] Dec. 16, 1980

[54] VISUAL SIMULATOR PROJECTION SYSTEM

[75] Inventors: Hughie A. Brown, Jr., Dallas; Joe L. Walker, Grand Prairie, both of Tex.

[73] Assignee: Vought Corporation, Dallas, Tex.

[21] Appl. No.: 9,989

[22] Filed: Feb. 5, 1979

[51] Int. Cl.³ .............................................. G03B 21/20
[52] U.S. Cl. ....................................... 353/87; 353/11; 434/40; 434/44
[58] Field of Search ............................ 353/11, 85, 87; 35/12 N, 11, 425

[56] References Cited

U.S. PATENT DOCUMENTS 3,718,989  3/1973  McKnight .............................. 353/85

FOREIGN PATENT DOCUMENTS 1547523  6/1978  Fed. Rep. of Germany ............ 35/42.5
707877  4/1954  United Kingdom ...................... 353/11

Primary Examiner—John W. Shepperd
Attorney, Agent, or Firm—Jack A. Kanz; James M. Cate

[57] ABSTRACT

Disclosed is a mechanical translation linkage and lamp support apparatus for maintaining the projection light source inside a gimballed transparency displaced from the geometric center of the transparency and in a fixed spatial relation with the center of the transparency as the transparency rotates about any of its three mutually perpendicular axes. The translation apparatus employs only a mechanical linkage to ground and reacts to rotation of the support gimbal about either the X or Y axis to maintain the projection light source at the required position regardless of the attitude of the gimbal.

9 Claims, 5 Drawing Figures

VISUAL SIMULATOR PROJECTION SYSTEM

This invention relates to visual simulation systems. More particularly, it relates to methods and apparatus for maintaining a fixed spatial relationship between a projection light source and a transparency bearing a projectable image while the transparency is rotated about any of its axes to project visual simulation of pitch, roll and heading changes in a flight trainer or the like.

Simulators of various design and degrees of sophistication are currently used to familiarize pilots with flight characteristics of different craft. In order to simulate visual conditions external to the trainer cockpit, a visual image representing a real world scene as viewed from a fixed point in space is conventionally projected onto a viewing surface which substantially encompasses the student's field of view. Conventional visual simulation systems vary in complexity and sophistication from a fixed scene positioned in the student's field of view to computer-controlled image alteration systems with an infinite variety of display conditions.

The present invention relates to visual simulation systems employing at least one hemispherical transparency bearing a projectable image which is rotated about its three mutually perpendicular axes to project a moving image on a viewing surface within the student's field of view. In most such trainer systems, the student is surrounded by a substantially spherical viewing surface and the image projected onto the inner concave face of the sphere. Typically, the projector consists of a spherical transparency gimballed for movement about its three mutually perpendicular axes to simulate changes in aircraft attitude. The transparency is decorated in its upper hemisphere to depict the sky from horizon to horizon. The lower transparency depicts generalized terrain as viewed from a high altitude. A projection light source within the transparency sphere projects the image onto the viewing surface. Movement of the transparency about its axes, therefore, simulates changes in aircraft attitude.

Since the viewing surface and the transparency are spherical, the ideal location for the projector is the geometric center of the viewing sphere to prevent distortion of the display. However, the student must also view the display from the same point or his perspective of the display is distorted.

Since the observer and the projector cannot occupy the same space, the projector is customarily displaced from the geometric center of the viewing sphere and corrective measures taken to reduce the projection distortion. Furthermore, since the projection transparency must be mounted for rotation about its three axes, design considerations dictate that the transparency be divided into two hemispheres at the horizon to provide space therebetween for the apparatus for supporting and rotating the transparency. Accordingly, a separate projection light source must be used for each hemisphere. However, since the transparency hemispheres are fixed relative to each other, the two projection light sources may be fixed relative to each other, the separation therebetween representing the distance between the geometric centers of the two transparency hemispheres.

Since the student's eye is at the geometric center of the spherical viewing surface, the transparency must be displaced from the geometric center of the viewing sphere. To obtain maximum visual projection without interferring with the student's field of view, the projection transparency is preferably positioned above and usually slightly behind the student's head. Furthermore, since the image on the transparency is projected by a projection source within the transparency and the transparency is not located at the geometric center of the viewing sphere, the projection light source must be positioned at a point displaced from the geometric center of the transparency a distance and in the direction which corresponds to the displacement of the center of the projection transparency from the center of the viewing sphere. Therefore, the visual image is projected onto the display surface without distortion.

If both the transparency and the projection source are maintained at fixed spatial positions and the transparency rotated about its vertical Z axis to simulate yaw or heading change, the relative spatial positions of the viewer's eye, the viewing surface, the projection light source and the transparency remain fixed. Accordingly, no projection distortion occurs. However, if the projection transparency is rotated about its X axis to simulate roll or its Y axis to simulate pitch changes, the geometric center of the transparency moves with respect to the viewing surface and the viewer's eye. Accordingly, the projected image will be distorted unless the projection light source is also moved to maintain the light source at a position relative to the center of the transparency which is proportional to the displacement of the center of the transparency from the center of the viewing sphere.

U.S. Pat. No. 3,718,989 to Robert A. McKnight discloses a visual simulation system for a flight trainer comprising a spherical transparency for image projection onto a suitable viewing surface by a single light source located within the transparency sphere. The transparency is positioned directly above a viewer located in the geometric center of a spherical viewing surface. Accordingly, the single light source is located above the geometric center of the spherical transparency, the displacement of the light source above the geometric center of the transparency being proportional to the vertical displacement of the center of the transparency from the center of the viewing sphere. The transparency sphere may rotate about the Z axis to simulate yaw or heading change. Since the light source remains fixed with respect to the center of the sphere during rotation about the Z axis, no correction is necessary. The transparency sphere is also adapted to rotate about the X axis to simulate roll. Since the light source is supported on the Z axis directly above the center of the transparency, provisions must be made to maintain the light source fixed directly above the center of the viewing sphere as the transparency sphere rotates about the X axis. To accomplish this, the light source is mounted on a pivotally connected four bar parallelogram linkage connected to an external rotationally fixed point by an interconnection of chains and sprockets such that rotation of the sphere about the X axis maintains the light source spatially fixed directly above the center of the transparency sphere.

In the McKnight system, pitch changes are very limited. Accordingly, no provision is made to maintain the light source directly above the center of the sphere when the spherical transparency is rotated about the Y axis. In the simulator system for which the McKnight projector is designed, pitch changes are limited to 15°. Accordingly, distortion resulting from such limited pitch changes may be ignored. However, for more advanced systems wherein pitch changes may be 360°, provisions must be made for maintaining the light source in a fixed spatial relationship with the center of the spherical transparency as the transparency rotates through 360° about the Y axis.

A more advanced horizon projector design (known as the Northrup system) which makes corrections for changes in the pitch axis is described in NASA Technical Note (NASA TN D-7304, June 1973) entitled "Description and Performance of the Langley Differential Manuevering Simulator". In the Northrup projection system the spherical transparency is divided into two hemispherical transparencies separated by a gimbal support structure. The upper hemisphere carries a representation of the sky as viewed from the cockpit of an aircraft and the lower transparency is a representation of the ground as viewed from a selected altitude. Two light sources attached to a rigid rod are translated by X and Y axis servo systems inside the housing which interconnects the two transparencies. The two-axis lamp translation mechanism is a servo system responsive to externally generated signals. The externally generated signals are computer controlled to maintain the light sources in fixed spatial relationship with the geometric center of the spherical transparency as the transparency rotates about the center of the gimbal.

While the Northrup design provides means for maintaining the projection light source in a fixed spatial relationship with the center of the spherical transparency while the spherical transparency rotates about all three axes, the Northrup design requires external computer generated signals to control the X and Y axis servo systems and complicated slip ring electrical connections to transmit the externally generated signals to the internally positioned servo mechanism. Accordingly, the two axis computer-controlled servo system requires complex computer interface equipment and computer systems programs.

In accordance with the present invention, a visual simulation system is provided wherein the projection light source within the transparency is maintained at a fixed relative position with respect to the center of the transparency sphere as the sphere rotates about any or all of its three mutually perpendicular axes. Therefore, the projected image is never distorted. Furthermore, the projection source is maintained at its fixed relative position throughout rotation through 360° about any axis. The projection light source is maintained at its fixed relative position through a mechanical linkage interconnecting the projection lamp support structure and a fixed point external to the gimbal mechanism supporting the transparency and the lamp support structure so that movement of the transparency sphere about either the X or Y axis is translated to proportional movement of the lamp support structure to maintain the projection light source fixed with respect to the center of the transparency sphere. Since only a mechanical interconnection linkage is used, X and Y servo systems for moving the lamp support structure, computer systems programs and computer interface equipment are totally eliminated. Thus the desired undistorted projection throughout any movement of the projection transparency is accomplished with relatively simple and inexpensive apparatus.

Other features and advantages of the invention will become more readily understood from the following detailed description taken in connection with the appended claims and attached drawings in which:

Figure 1:
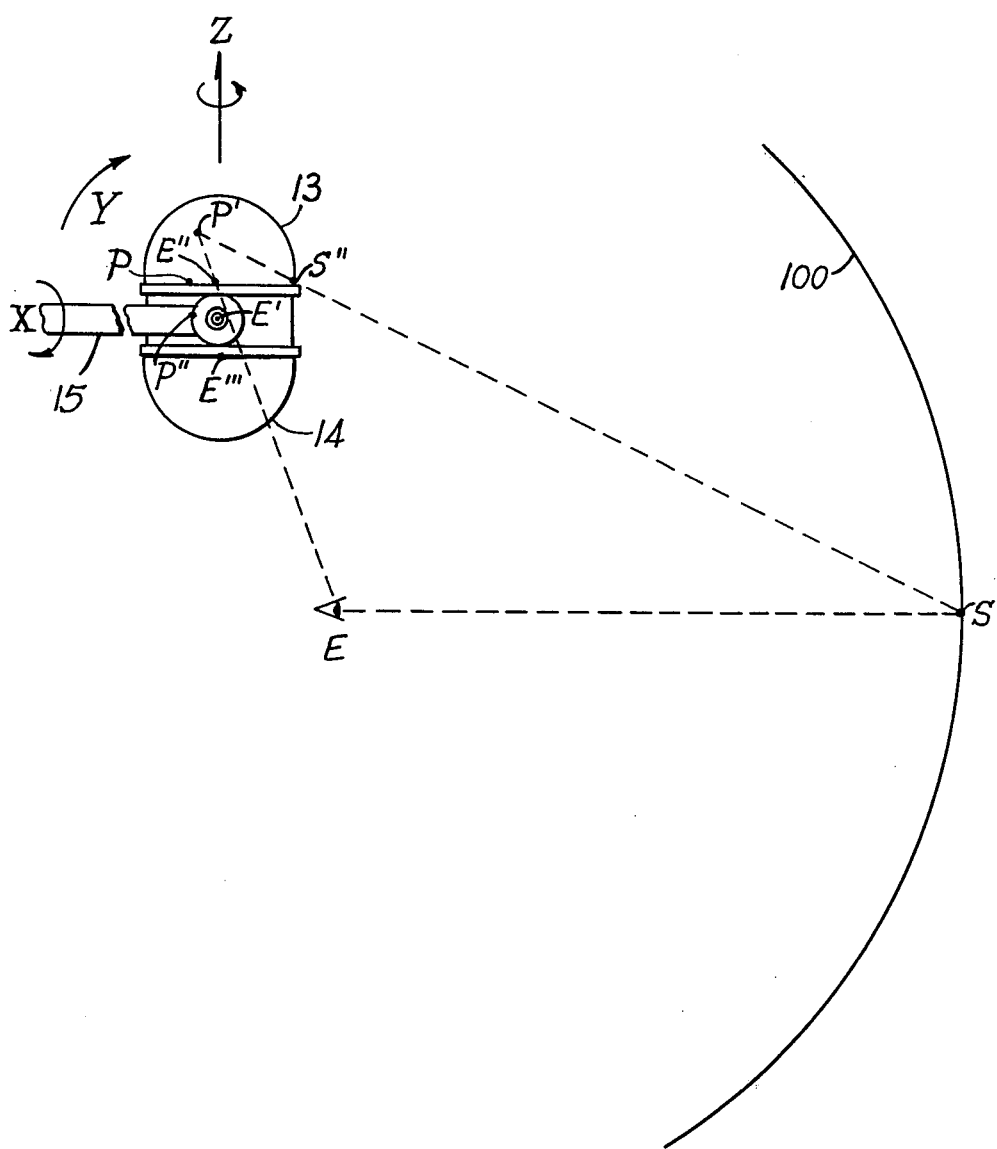
FIG. 1 is a diagrammatic representation of the spatial relationships which must be maintained to permit distortion-free image projection.

The spatial relationships involved in positioning the projection system in a simulator employing a spherical viewing surface are illustrated in FIG. 1. Where the viewer's eye E is positioned in the geometric center of the viewing surface 100 and the projection system is supported above and behind the viewer, the projection light source for a spherical transparency (indicated at P) must be positioned above and behind the center E' of the transparency. Since the transparency is split into two hemispheres, each hemisphere has a center E'' and E''' and two projection light sources P' and P'' are used. The spatial positioning of the light source, transparency, viewer and screen required to avoid distortion is shown by similar triangles $$\frac{ES}{EP} = \frac{E''S''}{E''P'}$$

Since the transparency is split into two hemispheres, the geometric center E'' of the upper hemisphere is physically spaced from the geometric center E''' of the lower hemisphere by a fixed distance occupied by the gimbal mechanism. Thus the projection light sources at P' and P'' are likewise spaced from each other the same fixed distance and supported by a lamp support, the geometric center of which may be considered as P when the center of the XY gimbal is E'. Therefore, the similar triangles to be considered become $$\frac{ES}{EP} = \frac{E'S'}{E'P}$$

where S' is the transparency surface represented by S'' and S''' if the transparency hemispheres were joined to form a sphere with E' as its geometric center.

It will be observed that when the transparencies are rotated about the Z axis, the spatial relationships remain unchanged. Therefore, no correction for distortion is required. However, if the gimbal is rotated to cause rotation of the transparencies about the X axis, the lamp support P must move in space and in a direction to maintain P' fixed in space with respect to E'' and S''. Similarly, when the gimbal is rotated to cause rotation of the transparency sphere about the Y axis, the lamp support P must move in space and in a direction to maintain P' fixed in space with respect E'' and S''.

Since the hemispherical transparencies are supported on a gimbal mechanism and fixed relative to each other, the two projection light sources at P' and P'' may also be fixed relative to each other and carried by a single lamp drive mechanism carried by the gimbal mechanism. The single lamp drive moves the lamp support point P at a particular radius and direction relative to the center of the gimbal support independent of the gimbal support attitude. This is accomplished, however, by a movement translation linkage mechanically interconnecting the lamp drive mechanism with a spatially fixed point which is independent of the gimbal support. The linkage arrangement of the preferred embodiment of the invention is illustrated in FIGS. 2, 3 and 4.

Figure 2:
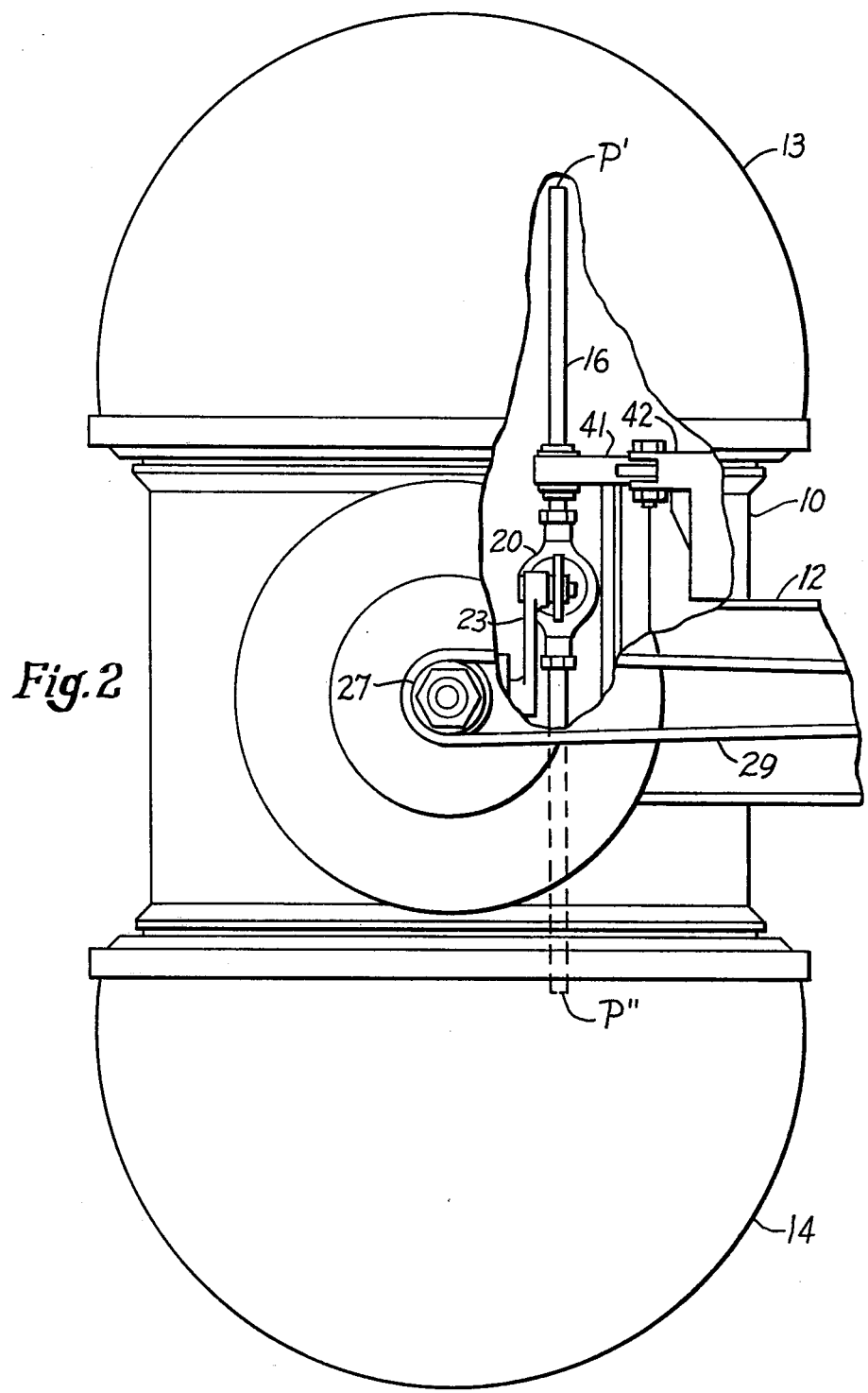
FIG. 2 is a side elevational partially broken away view of a gimballed projection system employing a mechanical projection light translating mechanism which maintains the desired relative positions of the projection light and the transparency as the transparency is rotated.
Figure 3:
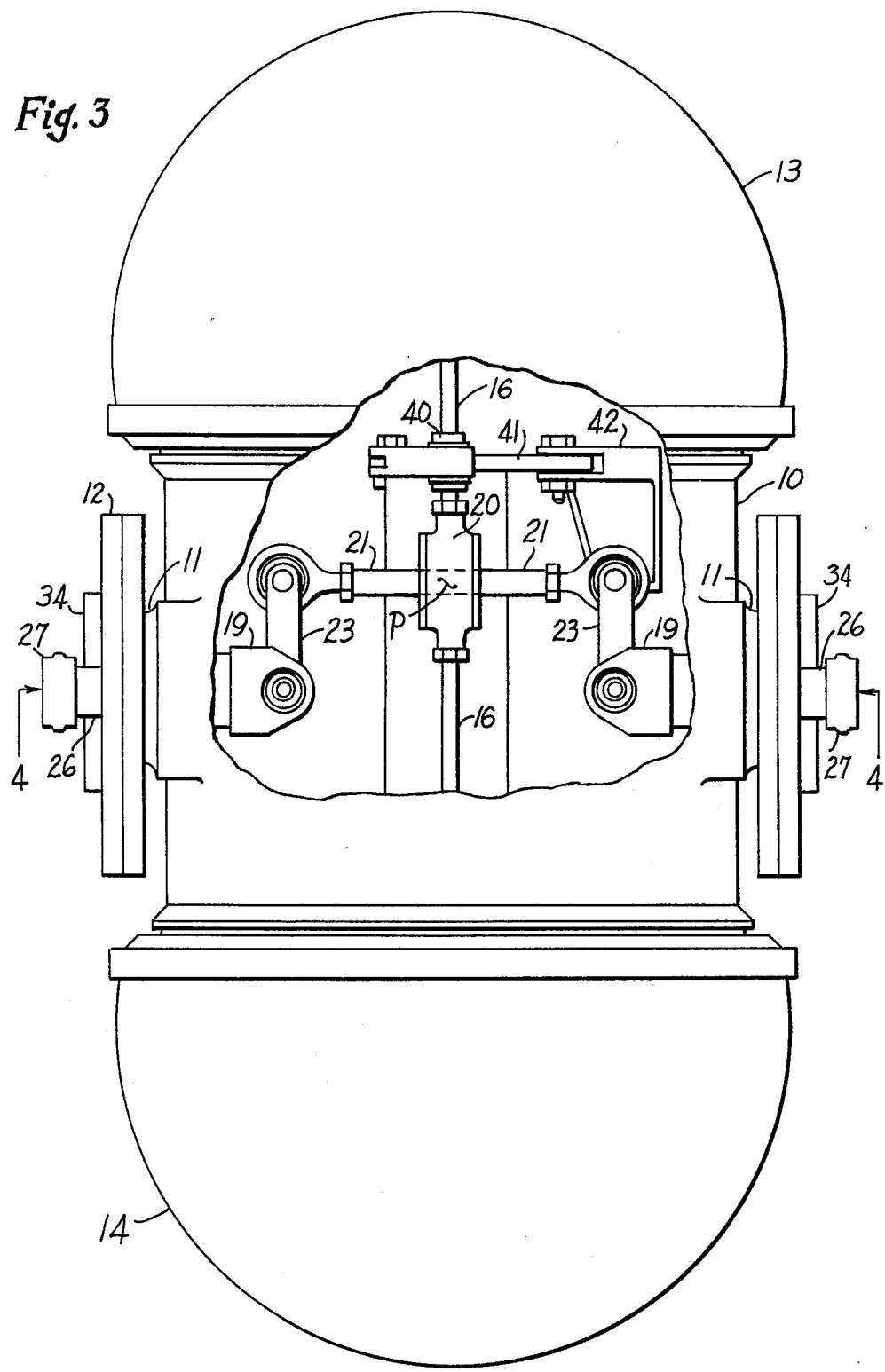
FIG. 3 is a front elevational partially broken away view of the apparatus of FIG. 2.
Figure 4:
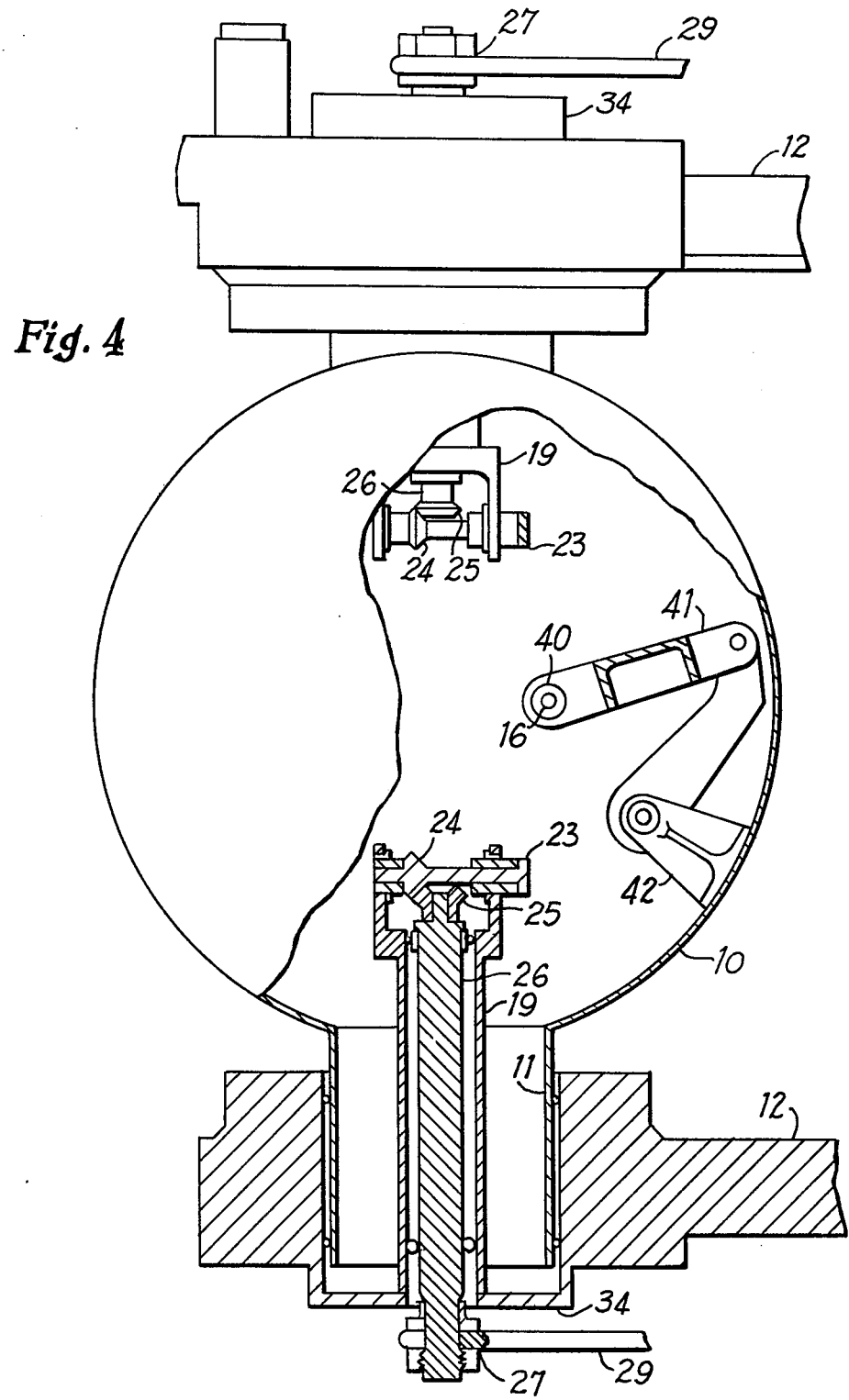
FIGS. 4 and 5, taken together, are a partially sectional view of the apparatus of FIG. 3 taken through section line 4—4.
Figure 5:
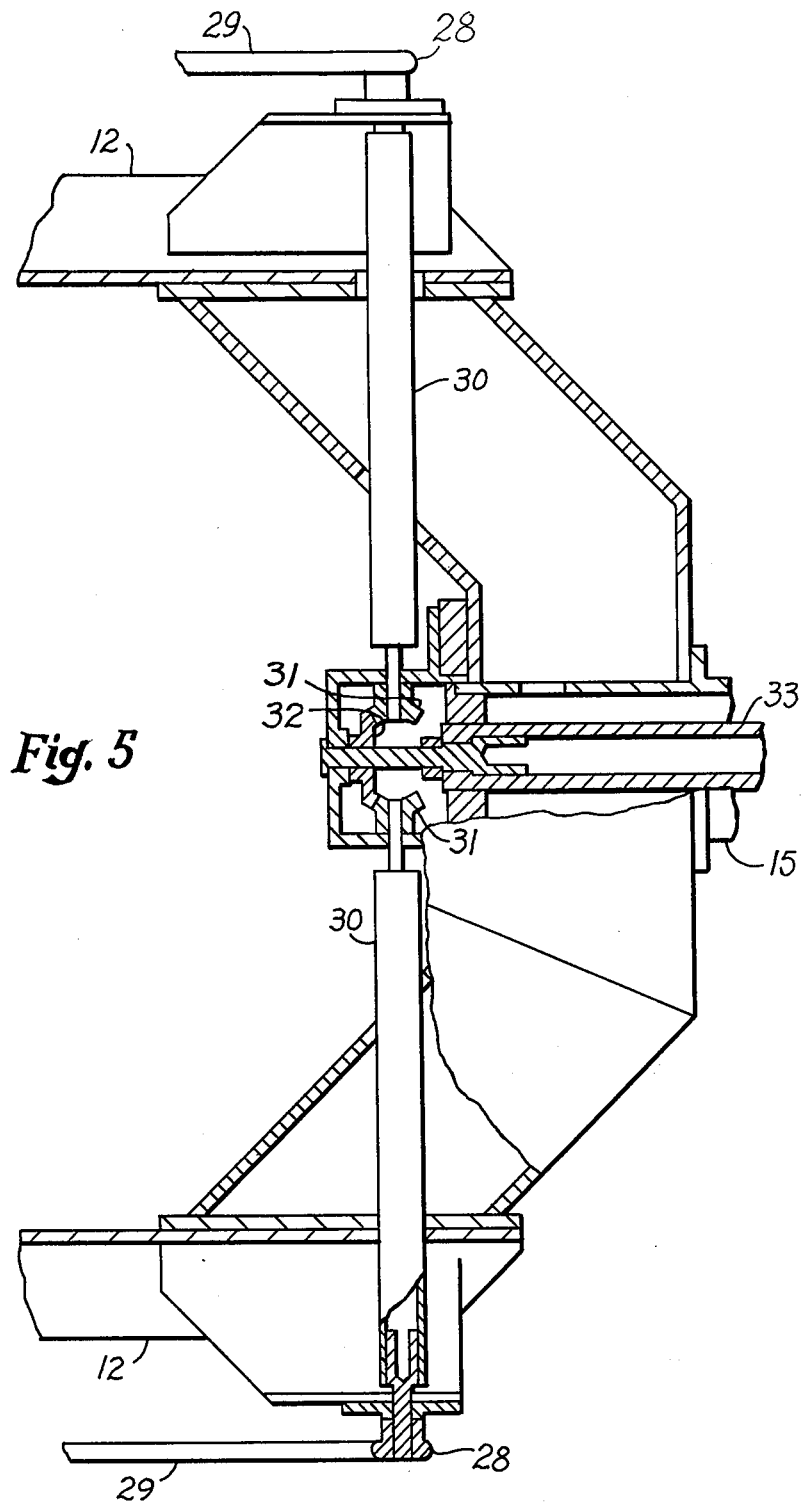

As illustrated in FIGS. 2, 3 and 4, the gimbal mechanism supporting the transparencies comprises a cylindrical housing 10 supported by pitch axles 11 extending centrally from the housing in the horizontal direction. The pitch axles 11 are rotatably journalled in a horizontally extending support fork 12 so that the housing 11 may rotate about the Y axis of the gimbal. The upper transparency 13 and lower transparency 14 are mounted on the ends of the cylindrical housing 10 and adapted for simultaneous rotation about the vertical Z axis of the gimbal which coincides with the Z axis of the transparency by a yaw drive motor (not shown) contained within the housing 10.

Rotation of the transparencies about the X axis of the gimbal to simulate roll is accomplished by rotation of the support fork 12. Rotation of the transparencies about the Y axis to simulate pitch changes is accomplished by rotation of the housing 10 about pitch axles 11. Pitch control motors (not shown) may conveniently be housed in the support fork 12 and control signals transmitted thereto by suitable slip ring connections or the like. It will thus be observed that the transparencies may be treated as a single spherical transparency independently rotatable about any of the three mutually perpendicular axes of the gimbal.

The point light sources P' and P" are at the ends of support rods 16. The light sources P' and P" are suitably small filament incandescent or arc lamps mounted at the ends of the support rods 16 and are of a source size and intensity appropriate for the sizes of the screen and transparency hemispheres according to principles well known to those skilled in the art. Support rods 16 are positioned diametrically opposed by rotational housing 20 so that the light sources P' and P" may move with respect to the housing 10 but always remain a fixed distance apart, the separation corresponding to the distance separating the horizontal equators of upper transparency 13 and lower transparency 14. Since the point sources P' and P" represent the positions of the projection light sources with respect to the centers of the hemispheres which are separated by the gimbal housing 10, and since the gimbal mechanism rotates about its geometric center on all three mutually perpendicular axes, the point equidistant from the outer terminal ends of the support rods 16 may be used as a reference point representing the point P and, so long as rods 16 are maintained parallel with the Z axis of the housing 10, P' and P" will be maintained at the same relative position with respect to the centers of the transparency hemispheres as point P is to the geometric center of the gimbal. Accordingly, by maintaining point P in the desired spatial relationship with respect to the center of the gimbal and the rods 16 parallel with the Z axis of the gimbal housing 10, the points P' and P" are automatically maintained at the desired location with respect to the geometric center of the transparency hemispheres 13 and 14. As illustrated in the drawings, a lamp rod support housing 20 supports the support rods 16 midway between ends P' and P". The support housing 20 is supported by connecting rod 21 which extends through the housing 20 and lies on a line 90° from the axis of support rods 16 with their mutual axes passing through point P. Connecting rod 21 is connected to bell cranks 23 by bearings at each end thereof. The opposite end of each bell crank is transversely trunnioned in the internal ends of pitch control tubes 19. Each bell crank 23 carries a roll motion bevel gear 24 on the end thereof which is driven by mating roll motion bevel gears 25 (see FIG. 4).

Roll motion bevel gears 25 are carried on the ends of roll motion drive shafts 26 which are rotatably mounted coaxially passing through pitch control tubes 19. Each roll motion drive shaft 26 carries a roll drive sprocket 27 on the outer end thereof. Roll drive sprockets 27 are connected to driver sprockets 28 by roll drive belts 29. The driver sprockets 28 are carried on the ends of cross shafts 30 mounted in the base of fork 12 parallel with roll motion drive shafts 26. The converging ends of cross shafts 30 carry bevel gears 31 which mate with bevel gear 32 carried by grounding shaft 33. Grounding shaft 33 is journalled coaxially in roll axle 15 supporting fork 12 and extends therethrough. The end thereof opposite bevel gear 32 is fixed to ground so that grounding shaft 33 is rotationally fixed with respect to the viewing sphere but roll axle 15 and fork 12 may rotate thereabout. Accordingly, fork 12 may be rotated to rotate the transparencies about the X axis to simulate roll. However, grounding shaft 33 remains stationary. Upon rotation of the fork 12, bevel gears 31 rotate about bevel gear 32. The net result is that rotation of fork 12 causes bell cranks 23 to rotate in the opposite direction and thereby maintain reference point P fixed at a particular offset and direction independent of rotation of the gimbal about the X axis.

The throw radius of bell cranks 23 and the offset of reference point P are determined, of course, by the spherical display screen radius, the radius of the transparency hemispheres and the displacement of the gimbal rotation point from the geometric center of the display screen as described hereinabove.

In order to maintain the light support rods 16 parallel to the Z axis of the gimbal while permitting the reference point P to rotate in a plane parallel with the Y axis, a support rod guide 40 is provided intermediate the end P' and reference point P and intermediate the reference point P and the end P". The guides 40 are each connected in one end of scissor assembly 41 which has its opposite end attached to boss 42 extending internally from housing 10 so that guides 40 permit the support rods 16 to move in a reciprocal manner therethrough and rotate in a plane parallel with the Y axis but always maintain the support rods 16 parallel to the Z axis.

To maintain point P offset to the rear of the Z axis at all times but permit the gimbal to rotate about the Y axis, pitch control tubes 19 are rotationally fixed with respect to support fork 12 by grounding plate 34. Thus as the housing 10 rotates about the Y axis on pitch axles 11, the axles 11 rotate about the pitch control tubes which are maintained rotationally fixed with respect to the support fork 12. Accordingly, lamp support housing 20 must be journalled to rotate about the connecting rod 21 as the housing 10 rotates about the Y axis. It will thus be observed that point P which represents the center of the lamp rod support housing 20 is always maintained to the rear of the Z axis regardless of the attitude of the gimbal. The housing 10 may rotate 360° about the Y axis but, since pitch control tubes 19 are rotationally fixed, point P remains fixed in space and the relationship between the center of the gimbal and point P remains fixed. However, since the housing 10 is rotated about the Y axis, housing 20 rotates about connecting rod 21 and points P' and P" move with respect to the center of the gimbal to maintain the desired spatial relationships regardless of the attitude of the gimbal. The rods 16 however, may only move in the plane parallel with the Z axis and the Y axis. Likewise, as the gimbal rotates about its X axis, point P is moved in the opposite direction to maintain the same spatial relationship.

It will be observed that the motion translation apparatus described is entirely mechanical and responds only to movement of the gimbal about the X or Y axis. Thus the apparatus of the invention totally eliminates the need for any external drive mechanism, computer systems and the like while providing accurate positioning of the projection light source with respect to the transparency regardless of the attitude of the gimbal mechanism.

While the invention has been described with particular reference to a specific embodiment thereof, it is to be understood that the form of the invention described in detail is to be taken as the preferred embodiment of same, and that various changes and modifications may be resorted to without depending from the spirit and scope of the invention as defined by the appended claims.

What is claimed:

1. A projection system for projecting a visual image onto the internal surface of a spherical viewing surface comprising:
    (a) first and second hemispherical transparencies bearing a projectable image, said transparencies separated and supported by gimbal means adapted to simultaneously rotate said transparencies about mutually perpendicular X, Y and Z axes at a point displaced from the center of said spherical viewing surface,
    (b) lamp support structure supporting a pair of spaced light sources, each of said light sources positioned at pre-determined positions which represent a single point displaced from the geometric center of the sphere formed by said first and second hemispherical transparencies, and
    (c) mechanical linkage means interconnecting said lamp support structure and a fixed point external to said gimbal means for maintaining said lamp support structure in a fixed spatial relation with the center of said sphere and the center of said spherical viewing surface regardless of the attitude of said gimbal means.

2. A projection system as defined in claim 1 wherein said first and second hemispherical transparencies are mounted on opposite ends of a cylindrical housing supported for rotation about its Y axis by axles extending transversely therefrom journalled in a support fork adapted to cause rotation of said housing about its X axis and wherein the intersection of the three mutually perpendicular axes of said gimbal means is displaced from the geometric center of said spherical viewing surface, and including a lamp support housing supported by said mechanical linkage means at a point displaced from the the geometric center of said gimbal means in the same direction and at a distance proportional to the displacement of said geometric center of said gimbal means from the geometric center of said spherical viewing surface.

3. A projection system as defined in claim 2 including an elongated pitch control member extending coaxially through each of said axles and rotationally fixed with respect to said support fork, a bell crank transversely trunnioned in the internal end of each of said pitch control members with the opposite end of each bell crank supporting a connecting rod supporting said lamp support housing between said bell cranks and journalled for rotation about said connecting rod.

4. A projection system as defined in claim 3 including lamp positioning rods extending in opposite directions from said lamp support housing and means for maintaining said lamp positioning rods mutually coaxial and parallel to the central axis of said housing regardless of the attitude of said housing and permitting said positioning rods to move only in a plane parallel to the central axis of said housing.

5. A projection system as defined in claim 3 including a first rotatable shaft extending coaxially through each of said pitch control members and adapted to cause rotation of said bell cranks in a plane parallel to the axis of said pitch control members, a ground shaft extending coaxially through the base supporting arm of said support fork and rotationally fixed with respect to said spherical viewing surface, a second rotatable shaft extending through the base of said support fork parallel to said first rotatable shaft and engaging said ground shaft so that rotation of said support fork about said ground shaft causes rotation of said second rotatable shaft, and means for translating rotational movement of said second rotatable shaft to said first rotatable shaft.

6. A projection system for projecting a visual image onto the internal surface of a substantially spherical viewing surface comprising:
    (a) at least one hemispherical transparency bearing a projectable image supported by gimbal means adapted to simultaneously rotate said transparency about the mutually perpendicular X, Y and Z axes of said gimbal means, said gimbal means comprising a substantially cylindrical housing supported for rotation about its Y axis by axles extending transversely therefrom journalled in a support fork adapted to cause rotation of said housing about its X axis, said transparency mounted on the end of said housing and adapted for rotation about the Z axis of said housing,
    (b) lamp support structure carried by said gimbal means for maintaining a substantially point light source displaced from the geometric center of said hemispherical transparency and fixed in space with respect to the geometric center of said hemispherical transparency regardless of the attitude of said gimbal means, said lamp support structure comprising:
        (i) a lamp support housing carried on and rotatable about an elongated support rod supported by bell cranks,
        (ii) means for maintaining the Z axis of said lamp support housing parallel to the Z axis of said cylindrical housing,
        (iii) a pitch control member extending coaxially through each of said axles and rotationally fixed with respect to said support fork, each of said bell cranks trunnioned in one of said pitch control members to permit said bell cranks to rotate in a plane parallel to the Z axis of said cylindrical housing, (iv) a roll control shaft extending through each of said pitch control members and rotatably journalled therein, each pitch control shaft adapted to cause rotation of one of said bell cranks in a plane parallel to the Z axis of said cylindrical housing whenever said roll control shaft is rotated with respect to said support fork, (v) a ground shaft extending through the base of said support fork and rotationally fixed with respect to said spherical viewing surface, (vi) roll drive shafts supported by said support fork in a plane parallel to said axles and adapted to engage said ground shaft so that rotation of said support fork with respect to said viewing surface causes rotation of said roll drive shafts with respect to said support fork, and (vii) means for translating relative rotary motion of said roll drive shafts to relative rotary motion of said roll control shafts.

7. A projection system as defined in claim 6 wherein said gimbal means is displaced from the geometric center of said viewing surface and said point light source is displaced from the geometric center of said hemispherical transparency in the same direction and at a distance proportional to the displacement of the center of said hemispherical transparency from the geometric center of said viewing surface.

8. In apparatus for projecting a visual image onto the internal face of a substantially spherical viewing surface including gimbal means supporting at least one hemispherical transparency bearing a projectable image rotatable about the three mutually perpendicular axes of said gimbal means, the improvement comprising:

(a) lamp support structure carried by said gimbal means and movable with respect to the geometric center thereof, and (b) mechanical linkage controlling the position of said lamp support structure with respect to the X axis and the Y axis of said gimbal means comprising:

(i) first support means supporting said lamp support structure, said first support means comprising a support rod and means rotatably connecting said lamp support structure to said support rod, first and second, axially spaced and coaxially aligned support axles coaxial with the Y axis of said gimbal means; the support axles being mutually spaced by a distance sufficient to permit interposition therebetween of the lamp support structure during rotation of the gimbal means about the Y axis, the first support means further comprising means movably connecting said support rod to said first and second support axles for permitting movement of said support rod and lamp support structure in a plane parallel with the Z axis of said gimbal means, (ii) guide means carried by said gimbal means for maintaining said lamp support structure parallel with the Z axis of said gimbal means regardless of the attitude of said gimbal means, and (iii) motion translation means for moving said lamp support structure in a plane parallel with the Z and Y axes of said gimbal means in response to rotation of said gimbal means about its X axis, said motion translation means comprising a mechanical linkage mechanically grounded with respect to said gimbal means and which moves said lamp support structure in a plane parallel with the Z and Y axes whenever said gimbal means is rotated about its X axis.

9. The apparatus of claim 8 wherein said means movably connecting said support rod to said first and second support axles comprises bellcrank means connecting said first and second support axles to said support rod to effect movement of the support rod relative to said transparency in a plane parallel to the Z axis upon rotation of said gimbal means about its Y axis.

* * * * *